United States Patent [19] | [11] Patent Number: 4,920,355
Katerberg | [45] Date of Patent: Apr. 24, 1990

[54] INTERLACE METHOD FOR SCANNING PRINT HEAD SYSTEMS

[75] Inventor: James A. Katerberg, Kettering, Ohio

[73] Assignee: Eastman Kodak Company, Rochester, N.Y.

[21] Appl. No.: 386,746

[22] Filed: Jul. 31, 1989

[51] Int. Cl.$^5$ ........................ G01D 15/16; H04N 1/21

[52] U.S. Cl. .................................. 346/1.1; 346/75; 346/140 R; 358/296

[58] Field of Search ...................... 346/1.1, 75, 140 R; 358/296

[56] References Cited

U.S. PATENT DOCUMENTS

| | | | |
|---|---|---|---|
| 4,009,332 | 2/1977 | Van Hook | 364/900 |
| 4,198,642 | 4/1980 | Gamblin | 346/75 |
| 4,520,368 | 5/1985 | Ims | 346/75 |
| 4,622,560 | 11/1986 | Withoos et al. | 346/1.1 |

*Primary Examiner*—Bruce A. Reynolds
*Assistant Examiner*—Gerald E. Preston
*Attorney, Agent, or Firm*—John D. Husser

[57] ABSTRACT

An improved printing method using a print head having a linear array of print elements adapted to be indexed in a direction parallel to the line of the array direction to address successive groups of rows of print media pixels moved therepast in a direction generally perpendicular to the array direction. The method includes the steps of (i) selecting such print head to comprise an even number (A) of print elements located in a linear array and having with a uniform 2 pixel spacing; (ii) alternately indexing the print head, in a direction parallel to the array direction by the amounts of A−1 and A+1 pixels; and (iii) in correspondence with such alternate indexings respectively printing on even or odd rows of the print medium in accord with image information.

5 Claims, 3 Drawing Sheets

INTERLACE METHOD FOR SCANNING PRINT HEAD SYSTEMS

FIELD OF INVENTION

The present invention relates to dot matrix printers (e.g. ink jet printers) of the kind where there is a scan movement of the print head vis a vis the print media path and, more particularly, to methods for improving the printing interlace utilized in such systems to increase output resolution.

BACKGROUND OF THE INVENTION

For many printer systems of the kind described above, it is desirable to have two, three or more times as many print picture elements (pixels) per inch as there are print head printing elements (e.g. ink jet orifices) per inch. (Although the subsequent discussion will refer to the printing means as ink jets, they could be thermal printer elements, impact printer elements, or light emitter printer elements.) To achieve the higher resolution, the print head is indexed by appropriate amounts parallel to the linear direction of the array of jets. Each jet then can print at more than one pixel location on the line parallel to the array.

For example it might be desired to have a print resolution of 600 dots/inch (dpi) using a 300 jet/inch linear array print head. One known way to accomplish such a doubling of resolution is to do a simple two pass printing. On the first pass, dots are printed at 300 dpi parallel to the jet array and 600 dpi perpendicular to the array. The print head is indexed 1/600 inch and a second pass is printed. The print head is then indexed one array length and the same two pass printing sequence is again carried out. A disadvantage of this approach is that small jet to jet differences across the array can be accentuated because adjacent dot pairs are printed by the same jet, causing a banding artifact to be observable.

U.S. Pat. No. 4,622,650 discloses one approach to eliminate this banding artifact. Rather than use the two pass system described above where each pixel is addressed by a predetermined jet of the array, the '560 patent approach proposes a four or more pass scheme wherein each pixel location is addressable by two or more jets. A random or pseudo-random choice is made as to which of the two or more jets actually prints the pixel. This radomizing process helps to break up the visible banding.

However, the '560 patent technique has disadvantages. First, it slows down the printing process. Whereas the simple scheme for doubling the resolution required two printing passes, the '560 patent scheme requires four or more, halfing throughput. Second, besides the individual jet to jet differences of ink jet printers, there can be regional variations across the array which can affect several adjacent jets. These region variations can include, for example, air drag and fluid flow variations near the ends of the array and hole size variations due to orifice fabrication phenomena. The '560 patent approach of printing each pixel based on a random choice between adjacent jets, does not eliminate print banding caused by such region variations.

U.S. Pat. Nos. 4,009,332 and 4,198,642 describe different interlace approaches that reduce apparent banding by assuring adjacent pixels are not printed by the same or adjacent jets. However, the interlacing approaches described in these two patents each suffer a serious drawback. They do not allow for the simple doubling of pixel density when using an even number of addressable print elements. For printers ranging from impact printers to high resolution printers, a simple doubling of pixel density is often preferred over tripling or quadrupling. For most data system architectures, it is highly desirable to use $2^n$ addressable print elements.

SUMMARY OF INVENTION

Thus, a significant object of the present invention is to provide an improved interlacing method, for use in a scanning print head system, to: (i) avoid banding artifacts, e.g. due to bunching of defective print element pixels, and (ii) allow density doubling using an even number ($2^n$) print elements.

In one preferred embodiment the present invention constitutes an improved method of printing using a print head having a linear array of print elements adapted to scan, in a direction parallel to the line of its array, to address rows of print media pixels moved therepast in a direction generally perpendicular to the array direction. The method includes the steps of selecting such print head to comprise an even number (A) of print elements located in a linear array and having a uniform 2 pixel spacing; between print media passes, alternating indexing the print head in the scan direction parallel to the line of the array by the amounts of $A-1$ and $A+1$ pixels; and after each such alternate indexing, respectively printing on the even or odd rows of the print medium, in accord with image information.

BRIEF DESCRIPTION OF DRAWINGS

The subsequent description of preferred embodiments refers to the accompanying drawings wherein.

DETAILED DESCRIPTION OF PREFERRED EMBODIMENTS

Figure 1:
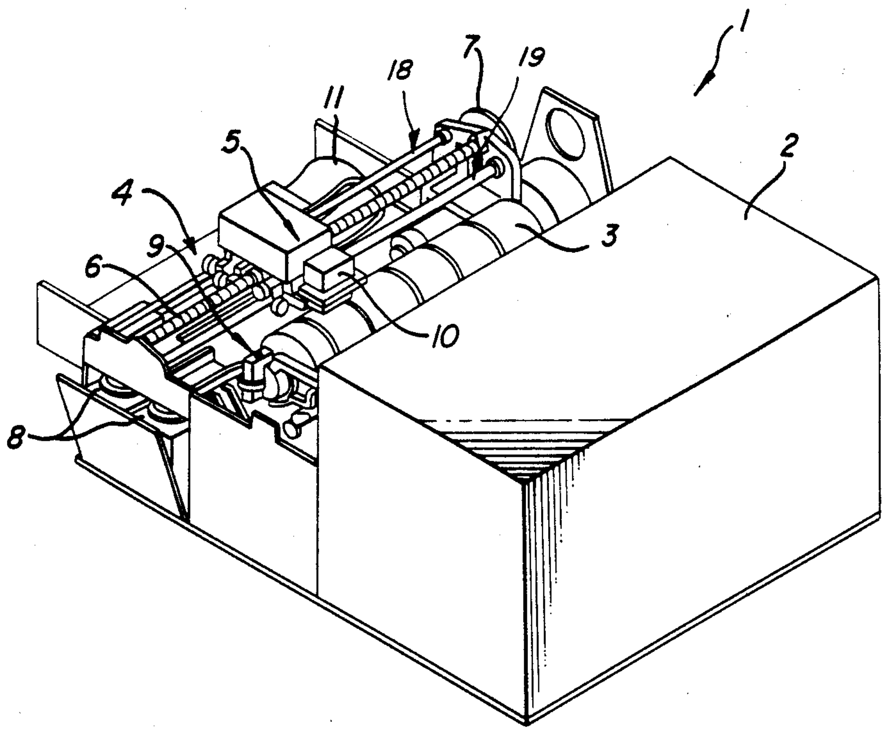
FIG. 1 is a perspective view of an ink jet printer apparatus of the kind in which the present invention can be incorporated.

The continuous ink jet printer 1 shown in FIG. 1 represents one apparatus in which the interlace printing method of the present invention can be advantageously incorporated. In printer 1, sheets of print media are fed from a supply 2 onto a print platen 3. For easy understanding, it can be visualized that the sheet is fed with its length along the platen axis so that the sheet rotates with the print line loci moving around the circumference of the platen. Thus, as print head carriage 5 is traversed along rails 18, 19 by drive motor 7 and helical shaft 6, the print head 10 moves to a position to successively address (i.e., be able to selectively print upon) circumferential pixel rows that will form print text lines.

In the exemplary embodiment, the print head comprises 64 orifices arranged in a linear array that is parallel to the direction of print head traverse and the axis of print medium rotation. Ink is circulated from supply 8 to the print head via umbilical 11, and drop streams are generated for each orifice and selectively charged or non-charged to be caught or passed to the print media. Station 9 comprises a start-up and storage site for the print head 10.

Figure 2:
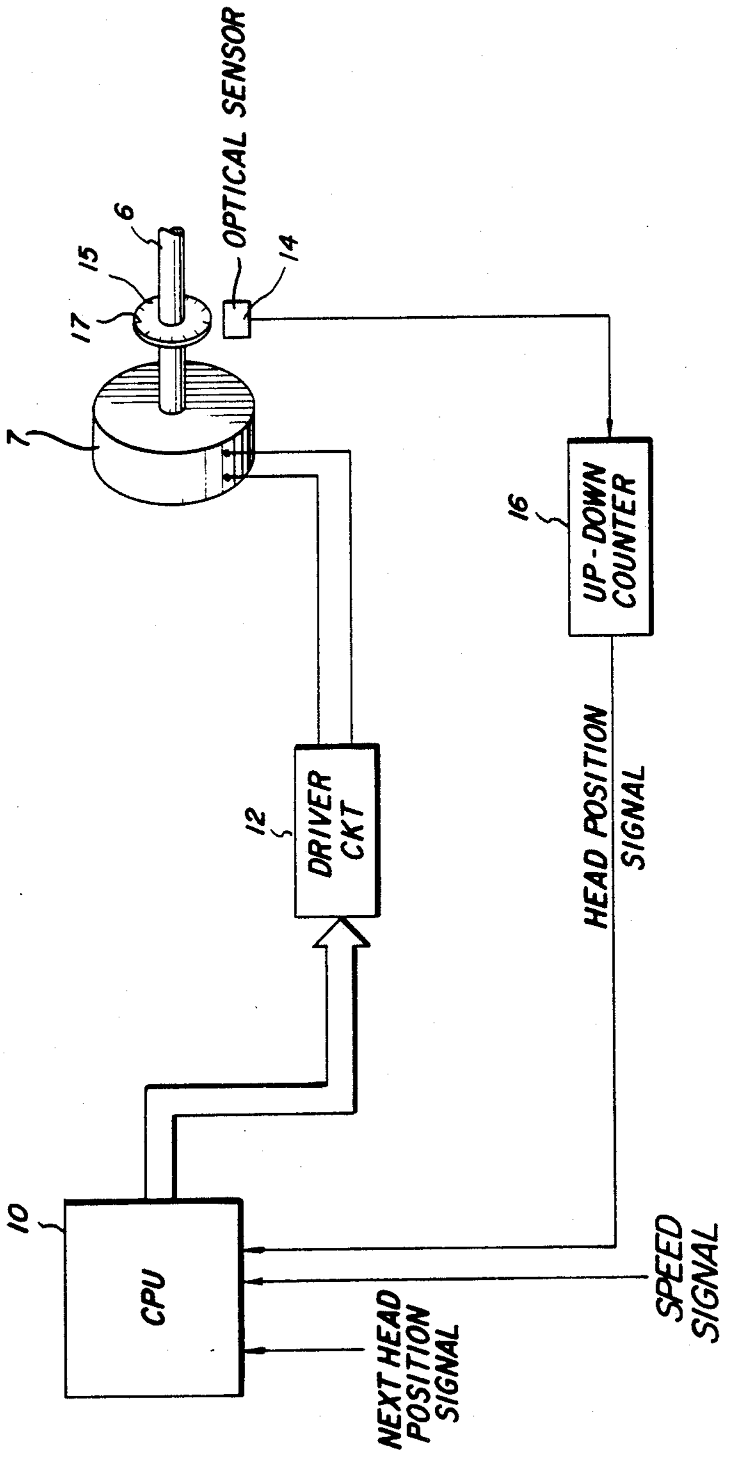
FIG. 2 is a schematic diagram of one system for positioning the print head carriage of the FIG. 1 printer for practice of the present invention.

Referring to FIG. 2, the drive shaft 6 is provided with a code wheel 17 that has a plurality of optical index marks 15. Each corresponds to a print (pixel) position along the print head path of traverse. An optical sensor 14 is positioned adjacent the encoding disk 17 to provide an electrical pulse each time an index 15 passes before the sensor 14. An up-down counter 16 is electrically coupled to the optical sensor 14 and provides a head position signal from an internal count. The count corresponds to the actual pixel position of the print head assembly along the surface of the rotatable cylinder 3. The head position signal is directed as an input to a computing element CPU 10 which may be a microprocessor. Another input to the CPU 10 is a speed signal corresponding to the operating (printing) speed of the printer system. A further input to the CPU 10 is a next head position signal corresponding to the next position desired by the input data and interlace routine for indexing the print head to its next print position. The output signal from the CPU 10 is connected to the input to a drive circuit 12. The driver circuit provides, in response to the position signal from the CPU, a driving potential to the drive motor 7 for rotating the shaft 6 in a direction and for an amount which positions the print head assembly at the next desired print position.

In the FIG. 1 printer the platen 3 has a circumference greater than a width of a print sheet which provides a gap between the edges of a sheet held (e.g. by a vacuum openings) on the platen. It is during the passage of this between-edges gap that carriage indexing is effected. That is, during such gap passage the print head is moved to different successive positions to address the successive parallel rows of pixel sites, which can be visualized as extending across the width of a supported sheet (i.e. as a plurality of parallel pixel width lines extending around the circumference of the platen).

Figure 3:
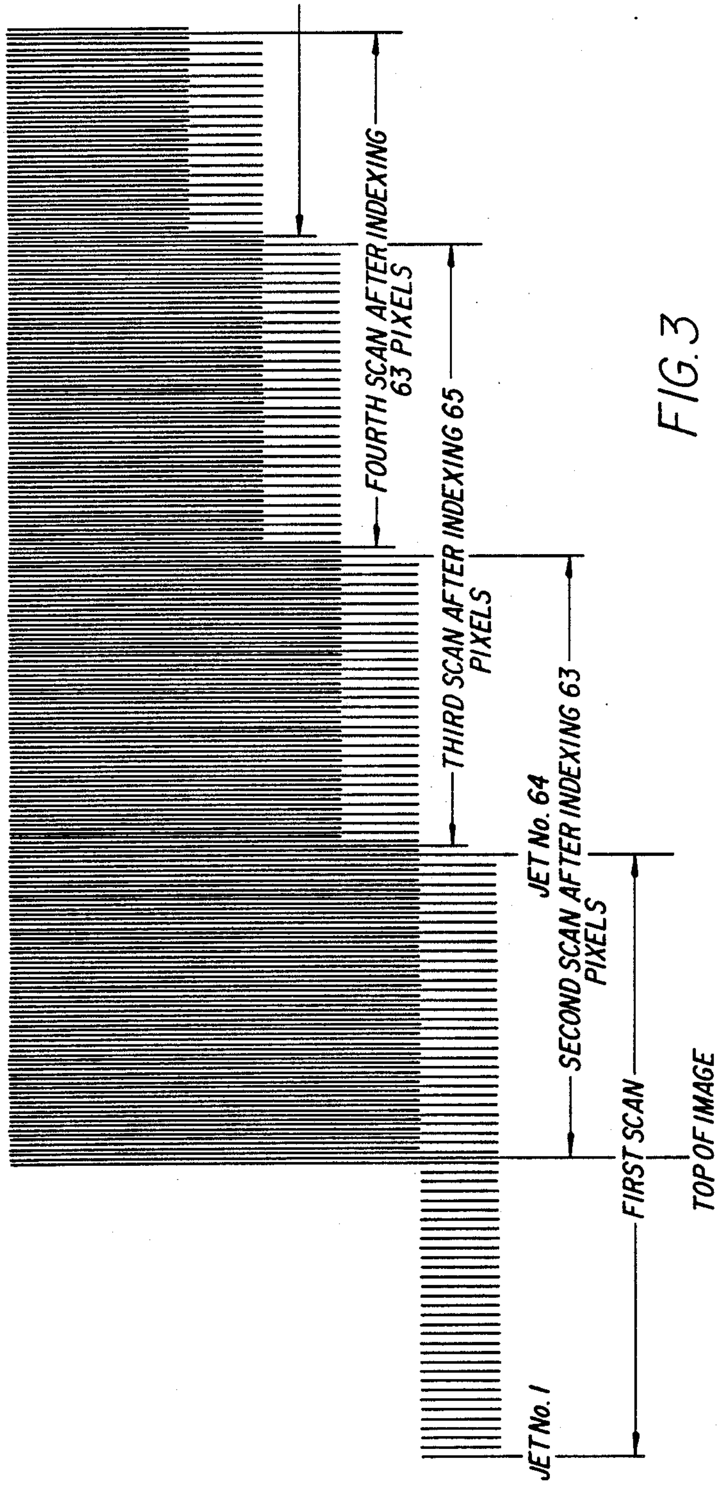
FIG. 3 is a diagram illustrating one embodiment of the interlacing print method of the present invention.

In accord with the present invention a printer such as described above can, with a print head having an even number of jets, A, achieve simple doubling of print resolution by interlacing. This method is illustrated in FIG. 3. In accord with this method, the jets of the linear print head array are each predeterminedly spaced 2 pixels (print locations) apart. The jets are numbered 1 to A and in the diagram of FIG. 3, A=64 jets. ON the first printing pass of the drum, the jets address (i.e. are located to print upon command from a data signal) the odd number of rows of pixels from 1 to 2A−1 (i.e. the odd rows of pixels 1-127). After this printing pass, the carriage is stepped over A−1 (in the FIG. 3 example, 63) pixels. In the next printing pass, even number rows of the left to right numbered pixel row positions A to 3A−2 (here row positions 64–190) are addressed for printing. The carriage is then indexed to the right A+1 (65) pixels, allowing the odd number rows in the positions 2A−1 to 4A−1 (here 127 to 255) to be addressed for printing. This alternating pattern of A−1 (63) and A+1 (65) pixel carriage steps during the passage of the between-edge print sheet gap is repeated from the top (left end on drum) to the bottom (right end on drum) the page. Beginning at row position A, the interlace has produced a print density of twice the jet density, allowing for a usable doubling of resolution. Pixel row A therefore serves as the starting row of the completely addressable image portion of the media.

This interlace method, which is illustrated for the example A=64 in FIG. 3, insures that no rows are missed or double printed. As all A of the even number (A) of jets can be printed on each pass, the data system is not made unnecessarily complex.

While the exemplary description above refers to a print head carriage that is stationary during printing and indexed while the between edge sheet gap on the drum is under it, it is also possible to employ the present invention with a continuous indexing of the print head carriage. In this mode, during each drum revolution, the carriage is smoothly advanced down the drum A pixels. As before, the print head has an even number A jets, each spaced 2 pixels apart. Between the trailing and leading edge of the paper on the drum, the carriage is alternately stepped forward or backward 1 pixel. As the step is very small, virtually no carriage settling time is required before printing the next line of print. The combined A pixel scan and the alternating forward or backward 1 pixel steps, again produce the desired interlace.

As with other printers which employ continuous carriage scans, the print medium may be loaded skewed to the drum such that the carriage scan and the skewed paper result in the image being square to the paper.

The invention has been described in detail with particular reference to certain preferred embodiments thereof, but it will be understood that variations and modifications can be effected within the spirit and scope of the invention. For example, the interlace method of the present invention is similarly useful in a thermal transfer printer of LED-electrophotographic printers in which the scanning print head comprises a plurality of addressable print elements arranged in a similar linear array with a 2-pixel pitch.

I claim:

1. An improved method of printing using a print head having a linear array of print elements adapted to be indexed in a direction parallel to the line of the array line to address successive groups of rows of print media pixels moved therepast in a direction generally perpendicular to the array direction, said method comprising:

(a) selecting such print head to comprise an even number (A) of print elements located in a linear array and having with a uniform 2 pixel spacing;

(b) alternately indexing the print head, in a direction parallel to the array direction by the amounts of A−1 and A+1 pixels; and (c) in correspondence with such alternate indexings respectively printing on even or odd rows of the print medium in accord with image information.

2. The invention defined in claim 1 wherein said print head is alternately indexed during a non-printing period of print medium rotation and is stationary during printing odd and even row sequences.

3. The invention defined in claim 1 wherein said print head is indexed continuously A pixel amounts during each print medium revolution and is alternately indexed forward and backward 1 pixel during the non-print portion of the revolution to effect the alternating A−1 and A+1 pixel shifts of the print head.

4. An improved method of printing using a print head having a linear array of print elements adapted to scan in a direction parallel to the array line to address rows of print media pixels moved therepast in a direction generally perpendicular to the array direction, said method comprising:

(a) selecting such print head to comprise an even number (A) of print elements located in a linear array with a uniform spacing of 2 pixels;

(b) on a first pass of the print media, printing, in accord with image information, on the odd number rows of pixels from row 1 to row 2A−1;

(c) indexing the print head in a direction parallel to the array direction by the amount A−1 pixels;

(d) on the second pass of the print media printing, in accord with image information, the even number rows of pixels from row A to row 3A−2;

(e) indexing the print head in the direction parallel to the array direction by the amount A+1 pixels;

(f) on the third pass of the print media printing, in accord with image information, on the odd number rows of pixels from row 2A−1 to row 4A−1; and (g) repeating such alternating A−1 and A+1 pixel indexings between even and odd row printing address to complete the print media page.

5. An improved method of printing using a print head having a linear array of print elements adapted to scan in a direction parallel to the array line to address rows of print media pixels moved therepast in a direction generally perpendicular to the array direction, said method comprising:

(a) selecting such print head to comprise an even number (A) of print elements located in a linear array with a uniform spacing of 2 pixels;

(b) alternately indexing the print head, between print media passes, in a direction parallel to the array direction by the amounts of A−1 and A+1 pixels; and (c) after such alternate indexings printing on even and odd rows of the print medium in accord with image information.

* * * * *